(12) United States Patent
Malagrino, Jr. et al.

(10) Patent No.: US 7,211,728 B2
(45) Date of Patent: May 1, 2007

(54) OPTICAL CAGE SYSTEM PREVENTING INSERTION OF INCORRECT MODULE

(75) Inventors: Gerald Daniel Malagrino, Jr., Rochester, MN (US); Michael L. Zumbrunnen, Rochester, MN (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 11/194,634

(22) Filed: Aug. 1, 2005

(65) Prior Publication Data

US 2006/0039123 A1    Feb. 23, 2006

Related U.S. Application Data

(60) Provisional application No. 60/602,064, filed on Aug. 17, 2004.

(51) Int. Cl.
*H02G 3/18* (2006.01)
(52) U.S. Cl. .................. 174/59; 174/50; 174/53; 385/92; 439/372

(58) Field of Classification Search .................. 174/59, 174/50, 53, 52.3, 260, 252, 52.1; 385/92, 385/135, 95; 439/607, 372
See application file for complete search history.

(56) References Cited

U.S. PATENT DOCUMENTS

| 4,862,320 | A | * | 8/1989 | Schmidt et al. ............. 361/693 |
| 5,261,024 | A | * | 11/1993 | Allen et al. .................. 385/135 |
| 5,289,345 | A | * | 2/1994 | Corradetti et al. .......... 361/752 |
| 6,304,436 | B1 | * | 10/2001 | Branch et al. .............. 361/683 |

* cited by examiner

*Primary Examiner*—Dhiru R. Patel
(74) *Attorney, Agent, or Firm*—Allen, Dyer, Doppelt, Milbrath & Gilchrist, P.A.

(57) ABSTRACT

The present invention relates to an opto-electronic system including an opto-electronic module and a cage assembly for electrically connecting and securing the electronic module to a host computer device. Corresponding mechanical features are provided on the module and the cage assembly to prevent modules from being plugged into incompatible cage assemblies.

16 Claims, 13 Drawing Sheets

OPTICAL CAGE SYSTEM PREVENTING INSERTION OF INCORRECT MODULE

CROSS-REFERENCE TO RELATED APPLICATIONS

The present invention claims priority from U.S. patent application Ser. No. 60/602,064 filed Aug. 17, 2004, which is incorporated herein by reference.

TECHNICAL FIELD

The present invention relates to an optical module/cage system for ensuring that only the proper optical module is inserted into a corresponding cage assembly, and in particular to mechanical features on the cage assembly and/or the optical module that prevent the wrong optical module from being inserted into the system's cage assemblies.

BACKGROUND OF THE INVENTION

A conventional opto-electronic system, illustrated in FIG. 1, includes an opto-electronic module 1, e.g. a transceiver, and a cage/guide rail assembly 2. The module 1 includes an optical connector 3 at a front end thereof, and an electrical connector 4 at a rear end thereof. Typically, the optical connector 3 includes a pair of ports for receiving a first optical fiber to be optically coupled to a receiver optical sub-assembly (ROSA), and a second optical fiber to be optically coupled to a transmitter optical sub-assembly (TOSA). The TOSA and the ROSA are disposed adjacent one another on a module printed circuit board within a module housing 6. For convenience, the electrical connector 4 is formed on an edge of the module printed circuit board.

The cage/guide rail assembly is for mounting in a host computer device, and includes a faceplate 7 mounted on an edge of a host printed circuit board 8, and a cage or guide rail 9 mounted on the host circuit board 8 extending from the faceplate 7. An access hole 10 is provided in the faceplate 7 enabling the module 1 to pass therethrough into the cage 9. An electrical connector 11 is mounted within the cage 9 for receiving the electrical connector 4, and for transmitting electrical signals between the host computer device and the opto-electronic module 1.

Conventionally, as new multi-source agreement (MSA) transceiver systems were developed, the cage or rail assemblies for securing the optical module to a host computer system changed significantly, so there was no confusion over which transceiver fit into which cage/rail assembly. However, currently there is a desire to maintain some of the existing module and cage sizes or dimensions to enable some parts to be used in multiple product lines. Unfortunately, problems can arise when new transceiver modules are plugged into systems with existing non-compatible electrical connectors, and vice versa, when old transceiver modules are plugged into new cages with new non-compatible electrical connectors.

An object of the present invention is to overcome the shortcomings of the prior art by providing a transceiver module/cage system that ensures transceiver modules can not be plugged into non-compatible cages.

SUMMARY OF THE INVENTION

Accordingly, the present invention relates to an opto-electronic system comprising:

an opto-electronic module including a housing and a first electrical connector, the housing including a groove therein; and a cage assembly for mounting on a host printed circuit board, the cage assembly including a faceplate, a cage, and a second electrical connector for mating with the first electrical connector, the cage assembly including a stop extending therefrom for preventing opto-electronic modules without the groove from becoming fully inserted into said cage assembly.

Another aspect of the present invention relates to an opto-electronic system comprising:

an opto-electronic module including a housing and a first electrical connector, the housing including a first camming surface; and a cage assembly for mounting on a host printed circuit board, the cage assembly including a faceplate, a cage, and a second electrical connector for mating with the first electrical connector, the cage assembly including a second camming surface extending therefrom for engaging the first camming surface, thereby preventing opto-electronic modules without the first camming surface from becoming fully inserted into said cage assembly.

BRIEF DESCRIPTION OF THE DRAWINGS

The invention will be described in greater detail with reference to the accompanying drawings which represent preferred embodiments thereof, wherein:

FIG. 6a is an isometric view of an electrical connector according to another embodiment of the present invention;

FIG. 6b is an isometric view of a opto-electronic module connected to the electrical connector of FIG. 6a;

DETAILED DESCRIPTION

Figure 1:
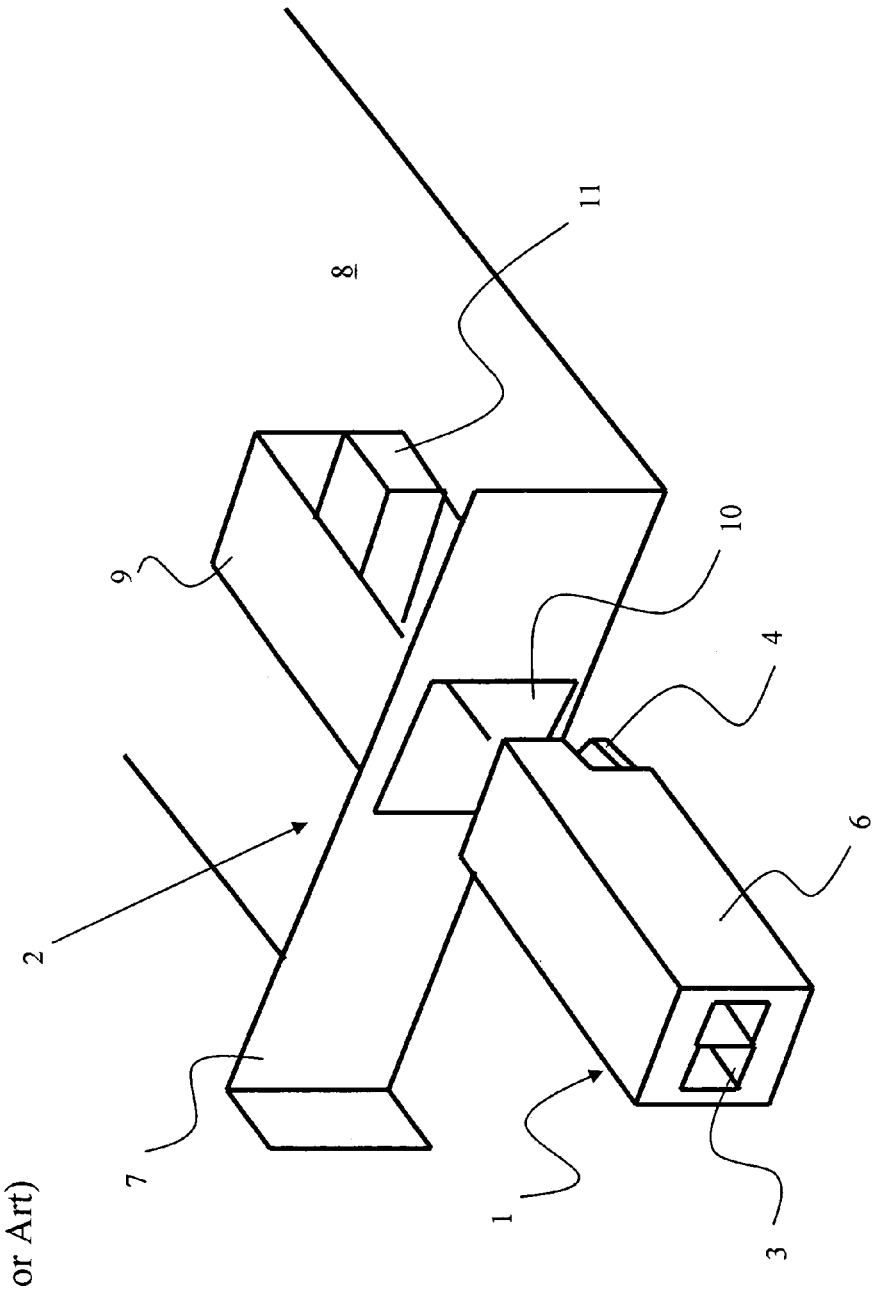
FIG. 1 is an isometric view of a conventional opto-electronic system.
Figure 2A:
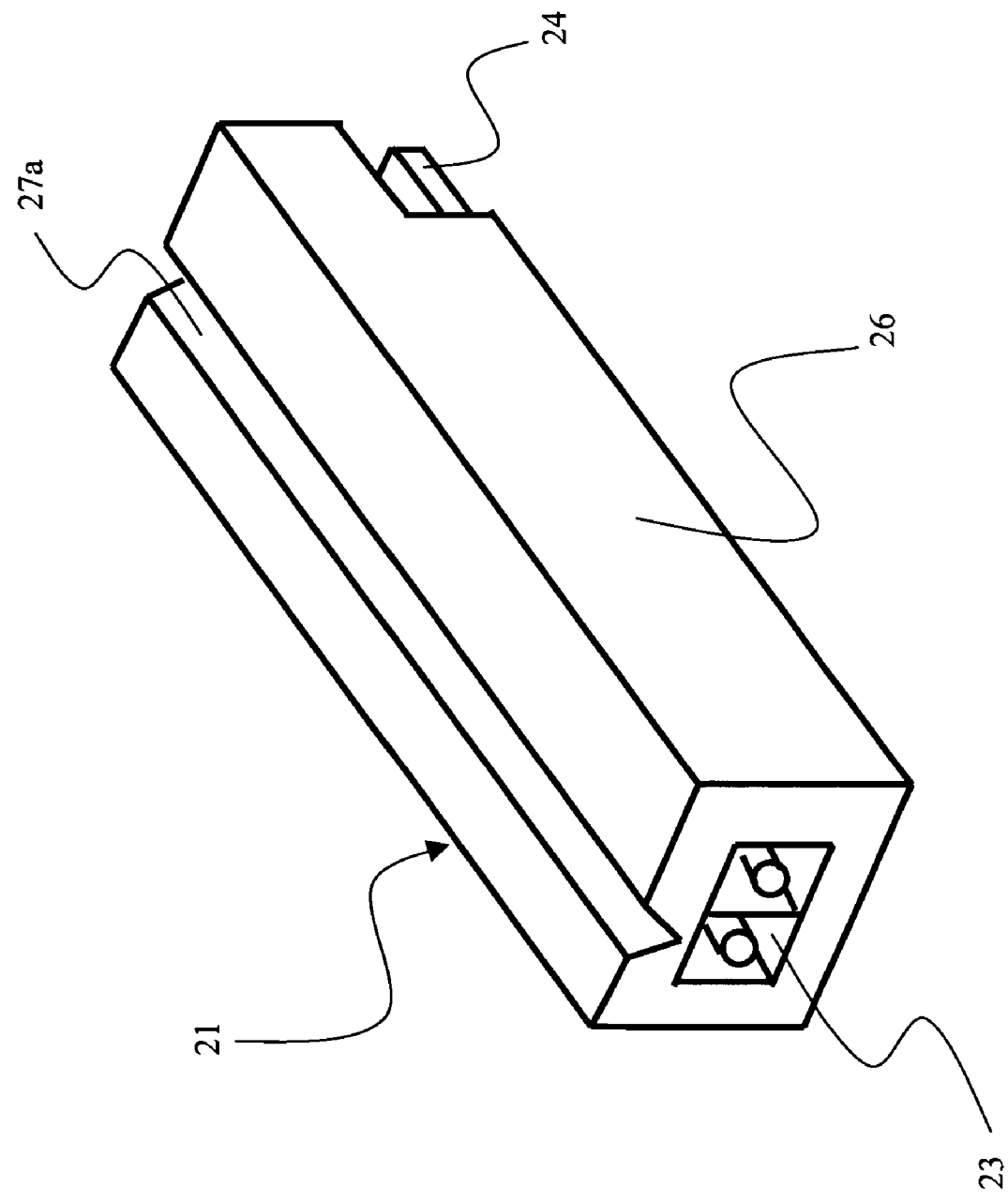
FIGS. 2a and 2b are isometric views of opto-electronic modules according to the present invention.
Figure 2B:
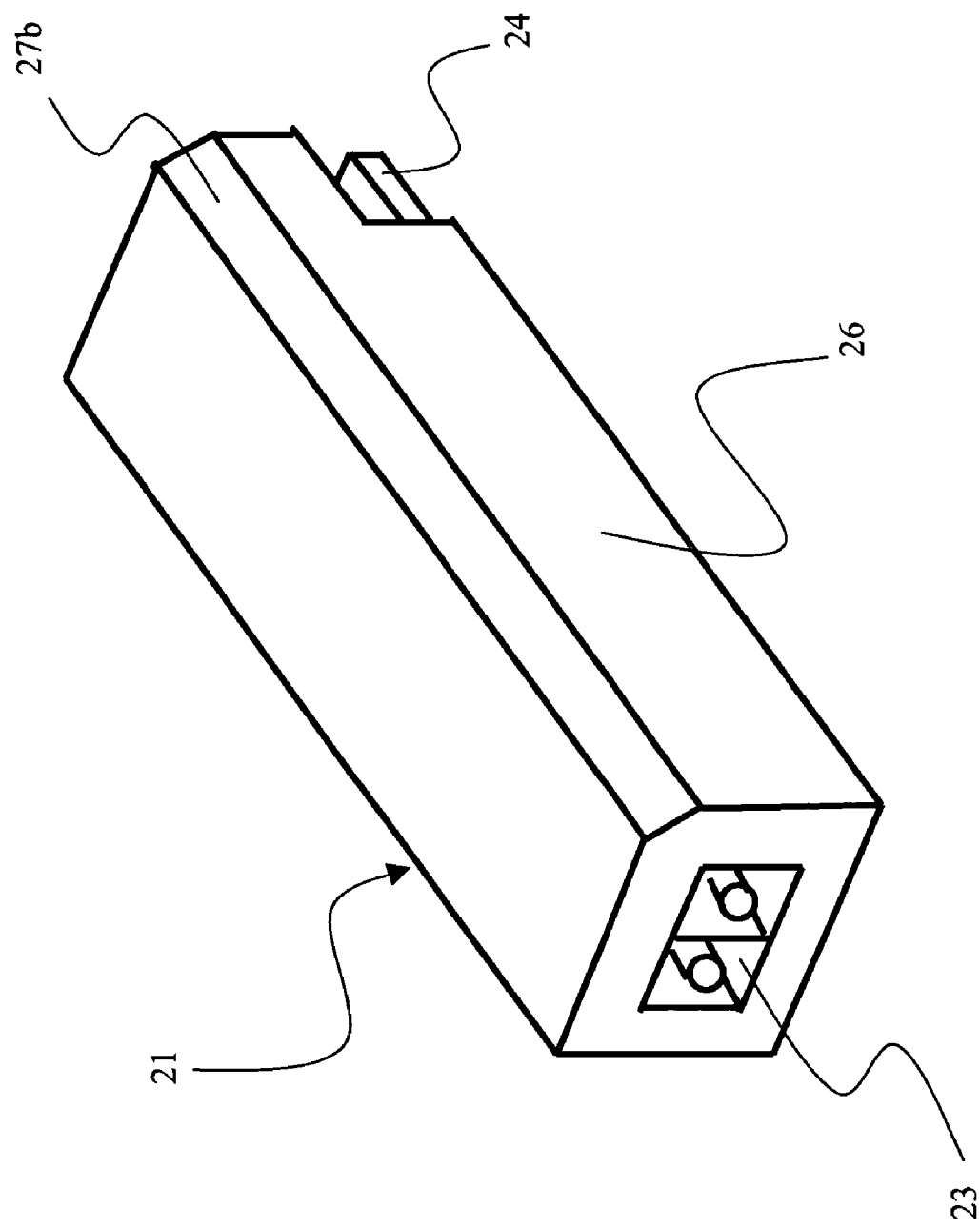

With reference to FIGS. 2a and 2b, an opto-electronic module 21 according to the present invention includes the same basic elements as opto-electronic module 1, i.e. an optical connector 23, and electrical connector 24, a ROSA, a TOSA, and a module printed circuit board. However, the module housing 26 includes a first mechanical feature, such as a groove 27a or 27b (FIG. 2b). Preferably, the groove 27a (or 27b) is triangular in cross-section and extends longitudinally along the top of the housing 26 from the front end to the rear end of the module 21; however, other configurations are possible, e.g. along the sides or bottom, extending only a partial distance between the front and rear of the module, having other shaped cross sections, and having multiple grooves. Positioning the groove 27b along the corner of the module housing 26, i.e. at the intersection of two perpendicular surfaces, e.g. the top and side walls, as in FIG. 2b, has manufacturing and structural advantages.

Figure 3:
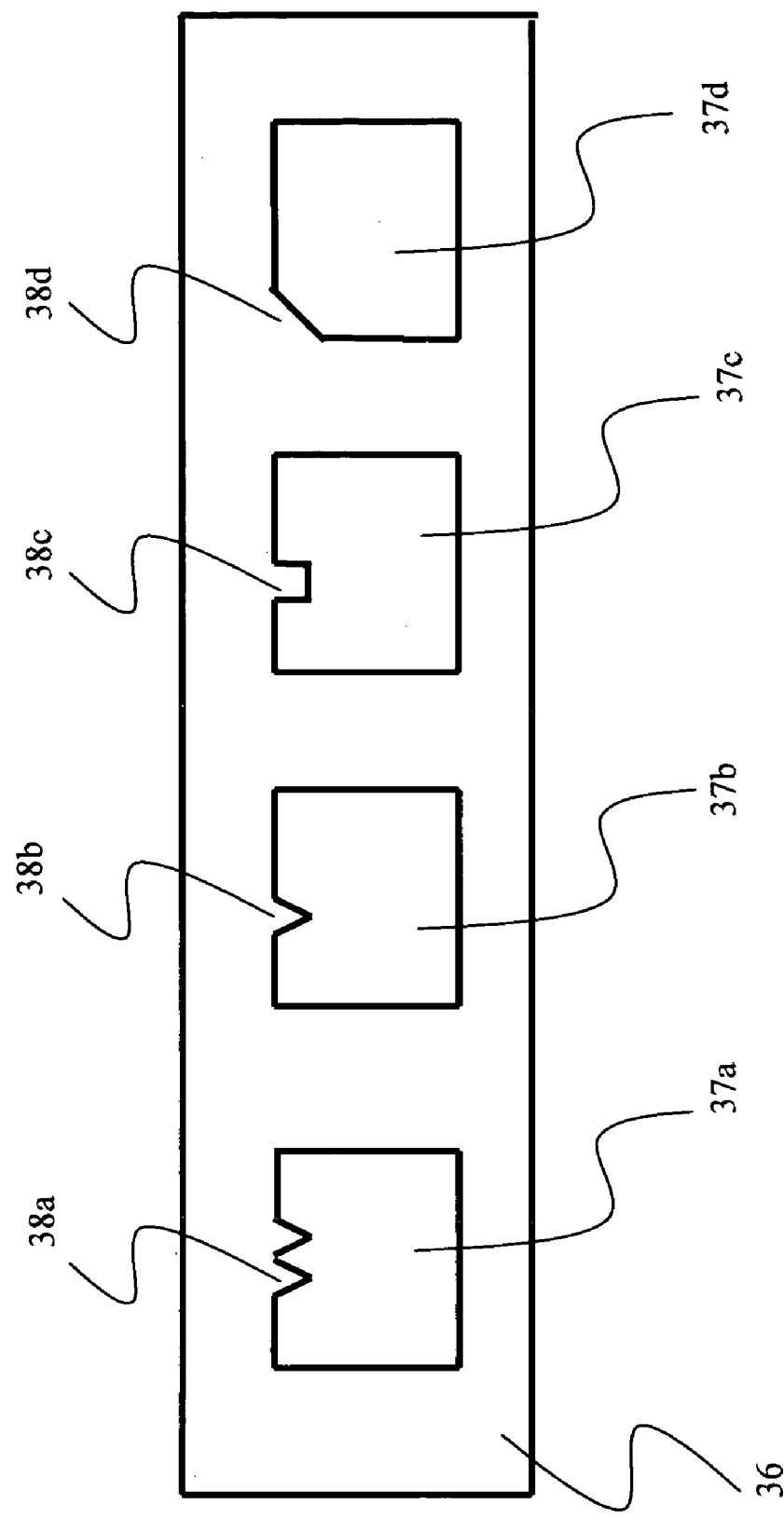
FIG. 3 is a front view of a faceplate including various embodiments of the present invention.
Figure 4A:
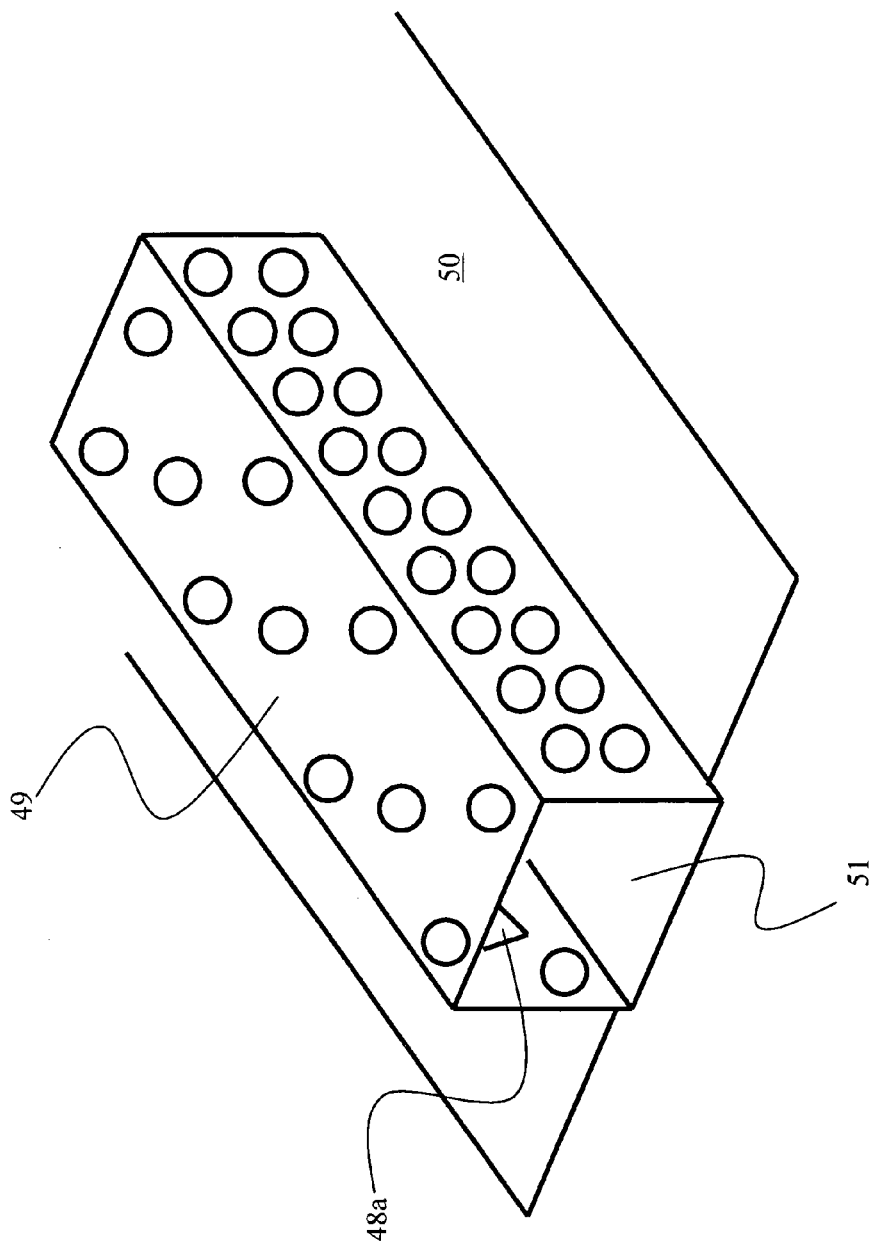
FIGS. 4a and 4b are isometric views of cages according to other embodiments of the present invention.
Figure 4B:
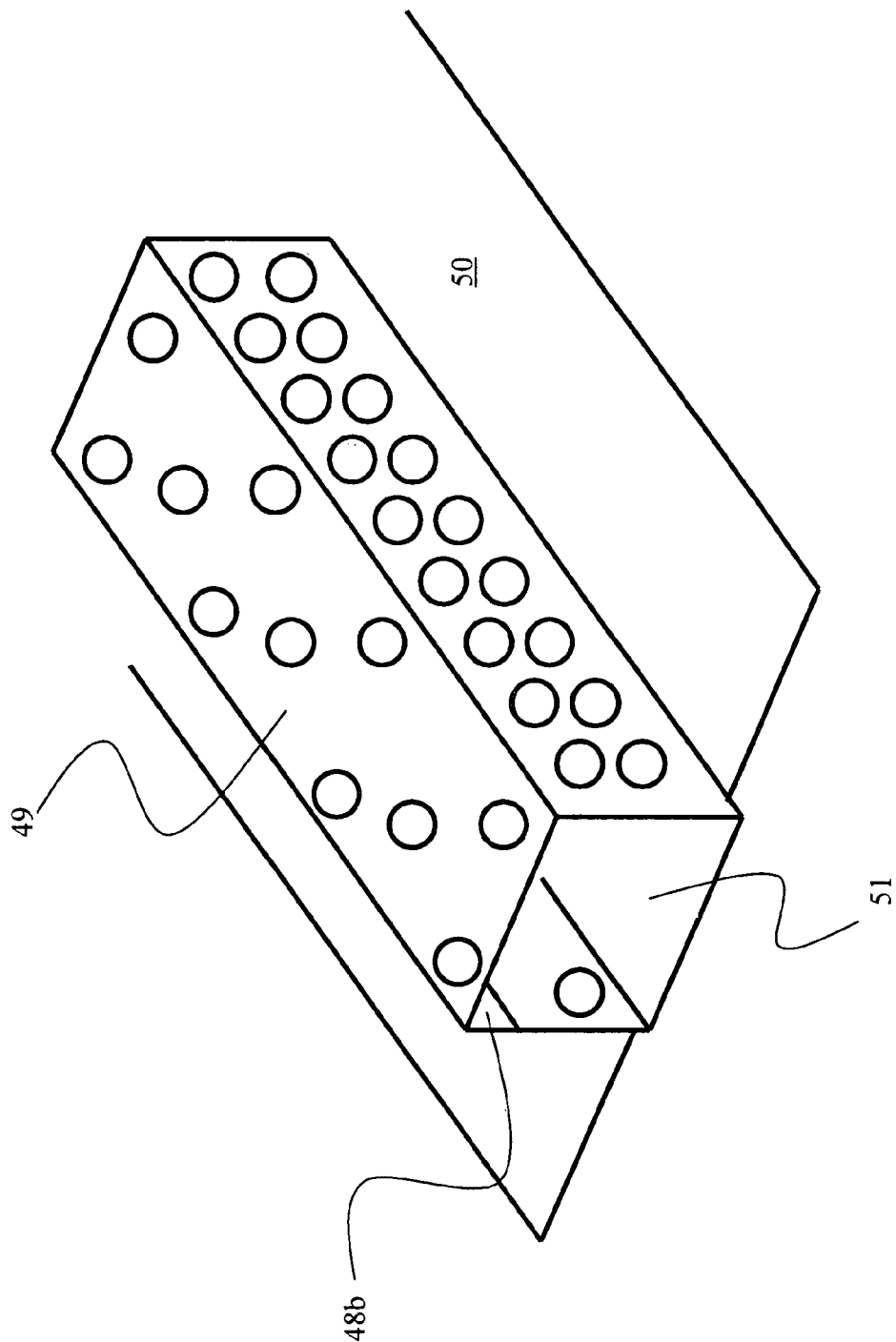
Figure 5:
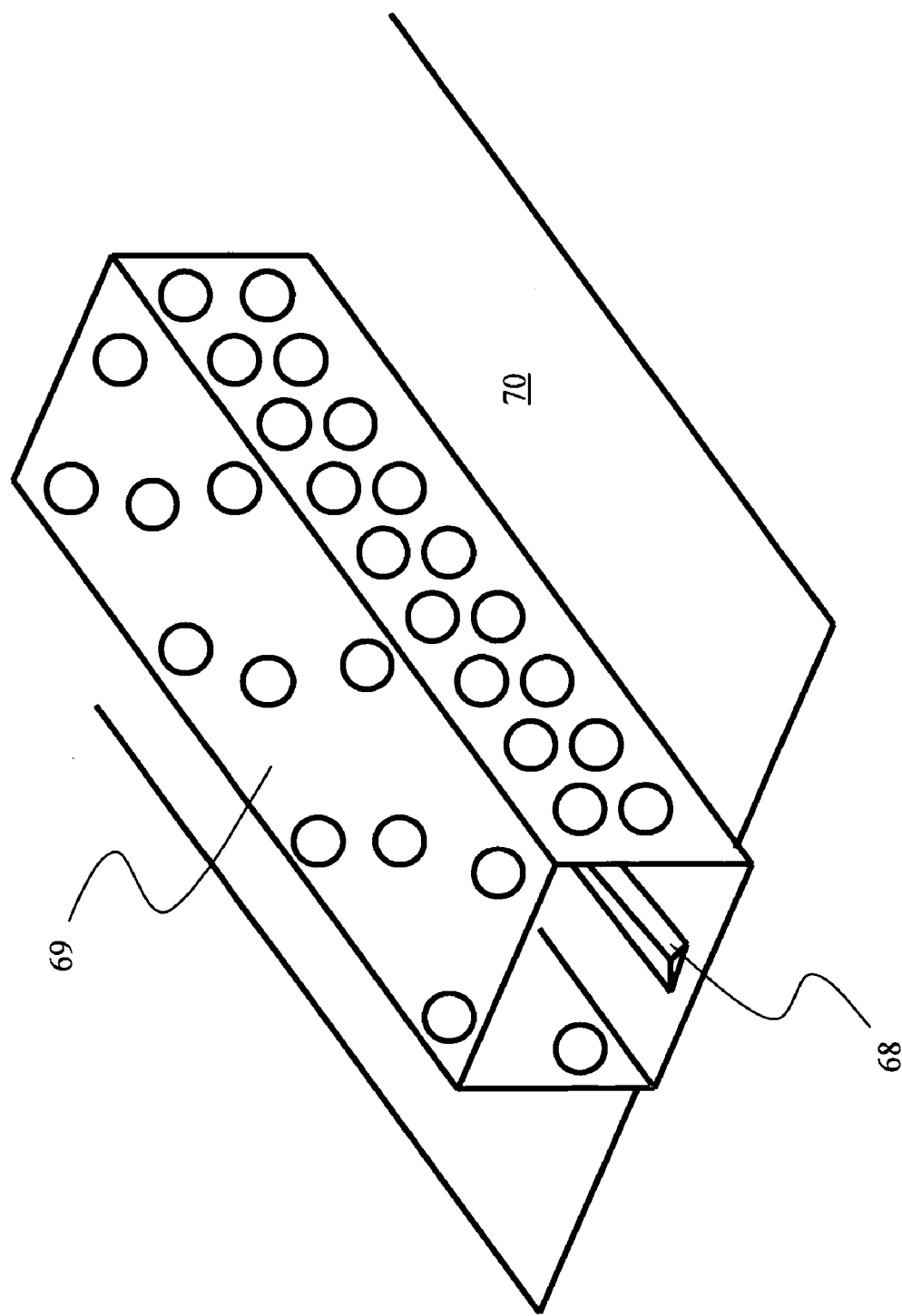
FIG. 5 is an isometric view of a cage according to another embodiment of the present invention.

FIGS. 3 to 5 illustrate various embodiments of the present invention in which different parts of a cage assembly include a second mechanical feature, e.g. a stop, for preventing an opto-electronic module (which otherwise has similar cross-sectional dimensions) without the first mechanical feature from becoming fully inserted into the cage assembly. With reference to FIG. 3, a faceplate 36, with opening 37a, 37b, 37c and 37d, includes the second mechanical feature in the form of projections or stops 38a, 38b, 38c and 38d extending into the openings 37a, 37b, 37c and 37d, respectively. The projections 38a, 38b, 38c and 38d are designed to match the shape of the groove 27a (or 27b) provided in opt-electronic modules that are compatible with the cage assembly. As with the above groove 27a (or 27b), the projections can take any form, including a "w" 38a, a "v" 38b, a rectangle 38c, and an angled corner 38d as long as the groove 27a (or 27b) is sized correctly to receive the projection and enable the module to pass unobstructed. Again the projections 38a, 38b, 38c and 38d can extend from any side of the openings 37a, 37b, 37c and 37d.

FIGS. 4a and 4b illustrate embodiments in which stop projections 48a and 48b, respectively, extends from a cage 49, which is mounted on host printed circuit board 50. Preferably, the projections 48a and 48b extend from a front edge of the cage 49 into the opening 51 formed by the cage 49, but can also be provided any where along the length of the cage 49 extending into the cavity created by the cage 49. Again, the stop projections 48a and 48b are sized to be received in the groove 27a and 27b, respectively, to enable the opto-electronic module 21 to pass into the cage 49 unobstructed, while preventing other opto-electronic modules with similar cross-sectional dimensions, but without the groove 27a or 27b, from entering or becoming fully engaged therein.

In an alternate embodiment illustrated in FIG. 5, the second mechanical feature is a stop projection or ridge 68 extending from the host printed circuit board 70 into the cavity defined by cage 69. The ridge 68 prevents opto-electronic modules without a groove 27a or 27b in the bottom thereof from entering the cage 69. As above, the ridge 68 can take any shape or form corresponding with the shape of the groove 27a or 27b.

Figure 6:
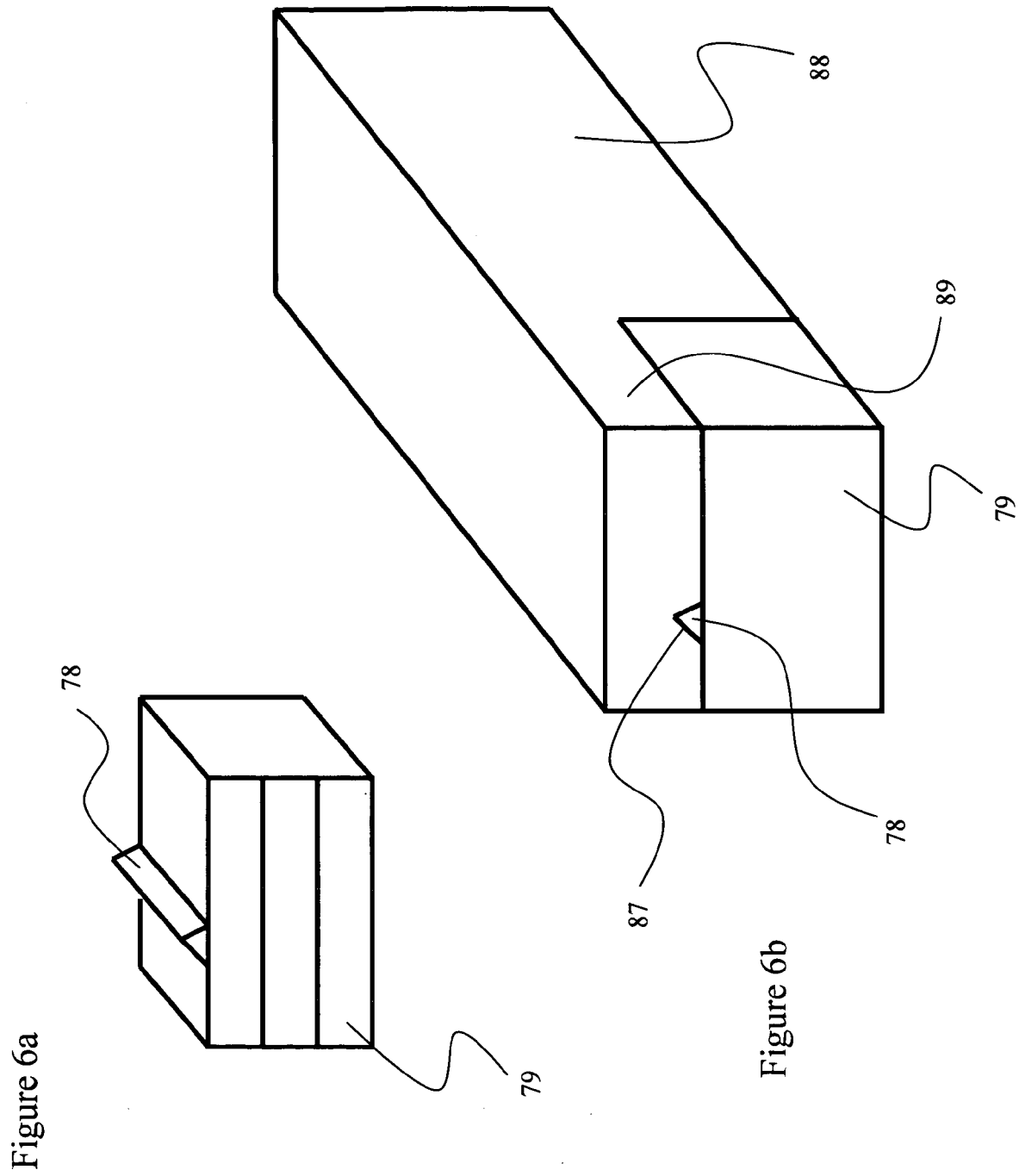

With reference to FIGS. 6a and 6b, a stop projection or ridge 78 can also be provided on an electrical connector 79 inside a cage (not shown). In this case a groove 87 is found in a rear end of the module housing 88, in the underside of tail 89. In this case the module housing 88 will be able to be partially inserted into the cage (not shown), but the electrical connectors will be prevented from becoming electrically coupled.

Figure 7:
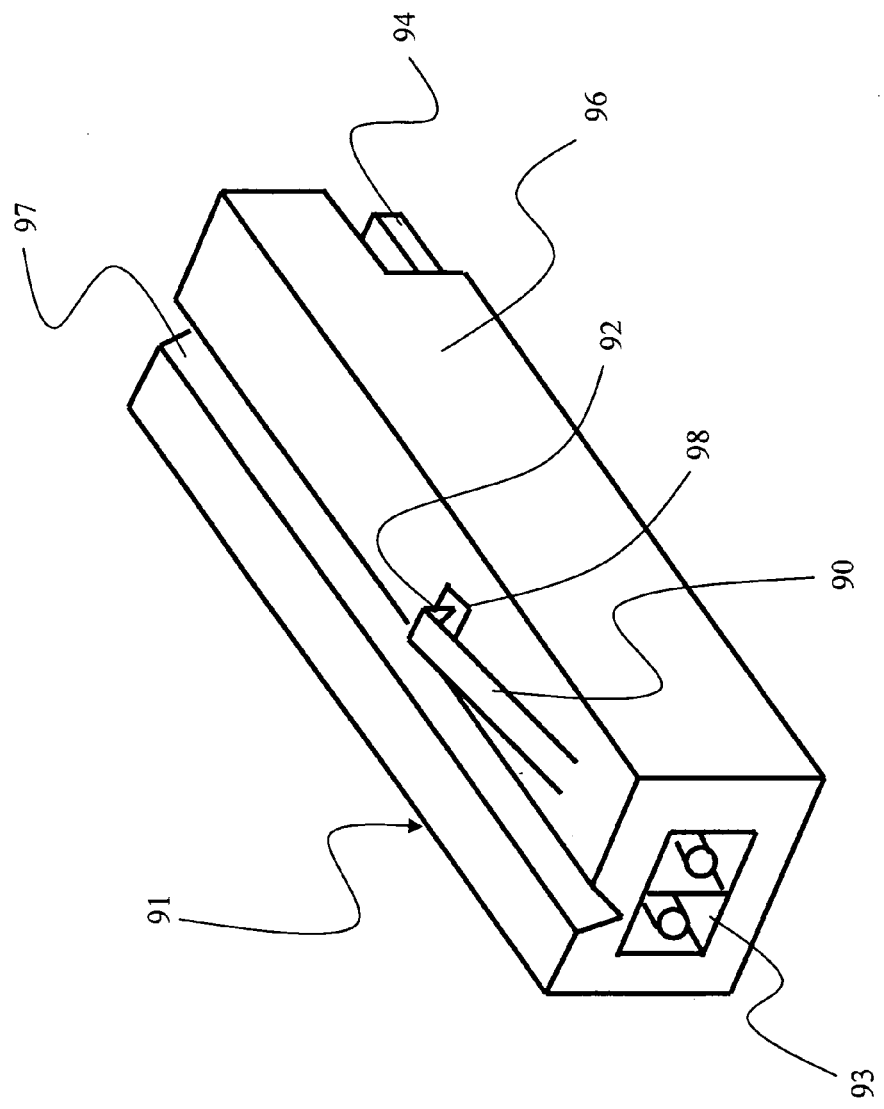
FIG. 7 is an isometric view of an opto-electronic module according to another embodiment of the present invention.

As a further or alternate means for preventing the insertion of opto-electronic modules into incompatible cage assemblies a spring finger 90 is spring biased outwardly from opto-electronic module 91 into an abutment position for abutting a portion of the cage assembly and preventing insertion thereinto. The spring finger 90 can be a leaf spring normally biased outwardly at an acute angle from the housing 96; however, any rotatable finger having resilience or simply biased outwardly would suffice. An abutting surface 92 is formed in the outer free end of the spring finger 90 for abutting a cage assembly unless the spring finger 90 is manually or mechanically rotated into contact with the module housing 96. The abutting surface 92 can be a portion of the outer free end of the spring finger 90 bent substantially perpendicular to the remainder thereof; however, a more complicated assembly is possible including a separate abutting surface fixed to the outer free end of the spring finger 90. As above, the opto-electronic module 91 includes an optical connector 93, a TOSA, a ROSA, a printed circuit board, and an electrical connector 94. In the illustrated embodiment of FIG. 7, a recess 98 is provided in the module housing 96 for receiving the abutting surface 92 when the spring finger 90 is rotated into contact with the module housing 96. With this arrangement, the optoelectronic module 91 can not be inserted into a regular cage assembly, i.e. without a second mechanical feature, without the additional step of rotating the spring finger 90 into an insertion position. The opto-electronic module 91 can also, but not necessarily, include a groove 97, as hereinbefore described, to enable the module 91 to be inserted into cage assemblies with the second mechanical feature, e.g. the projection 38, 48, 68 or 78.

Figure 8:
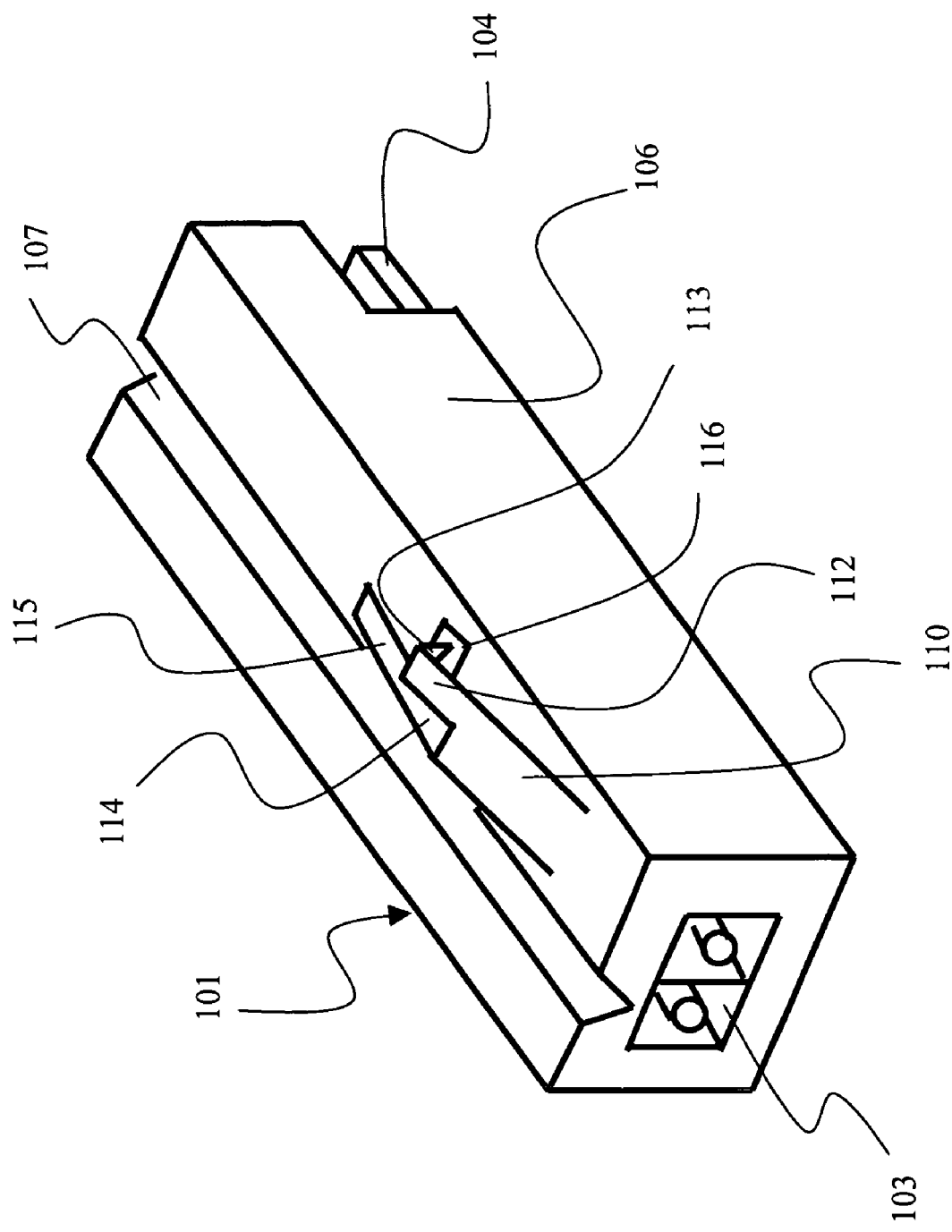
FIG. 8 is an isometric view of an opto-electronic module according to another embodiment of the present invention.
Figure 9:
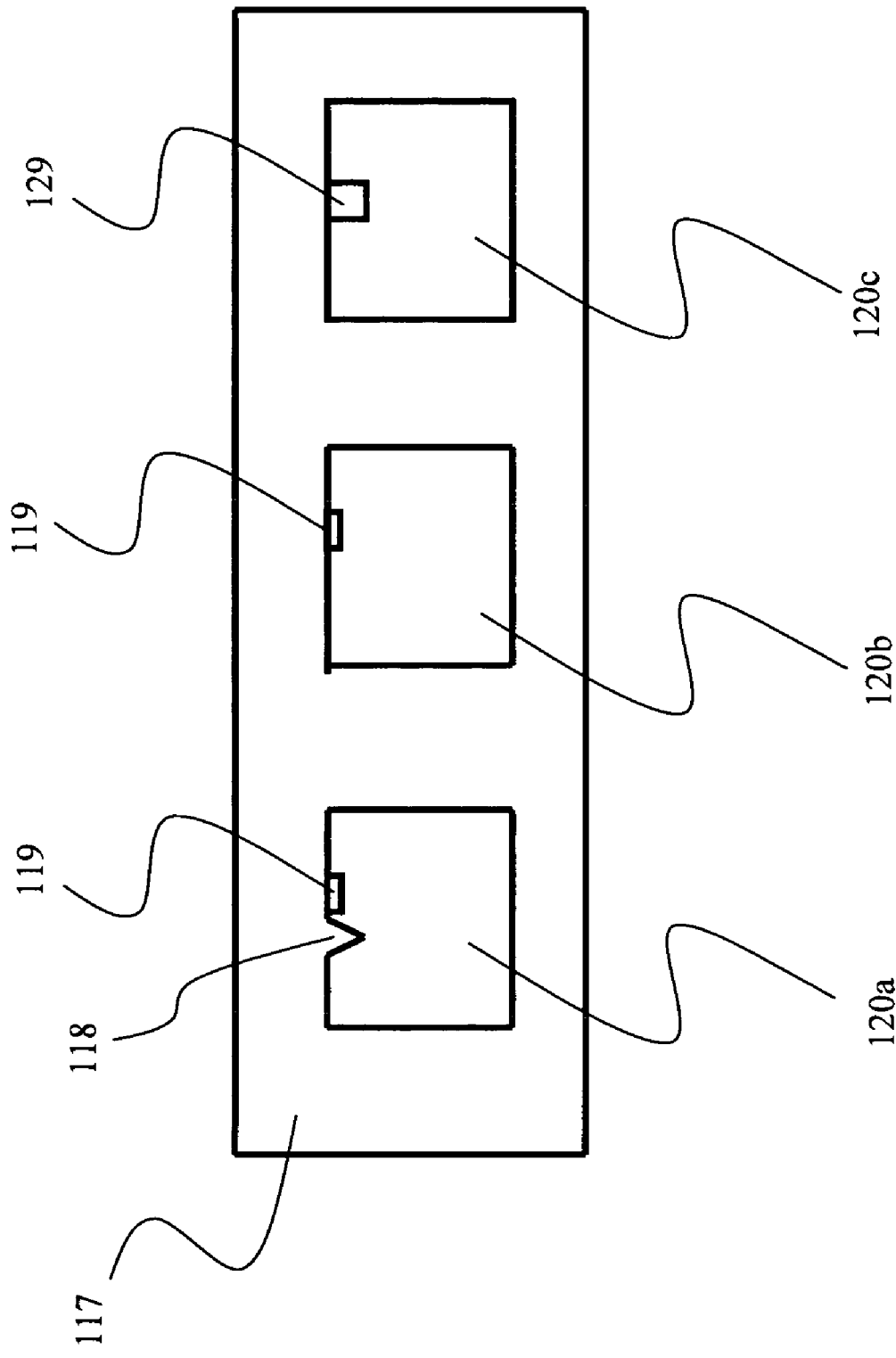
FIG. 9 is a front view of a faceplate according to another embodiment of the present invention.

With reference to FIGS. 8 and 9, an alternative embodiment of an optoelectronic module 101 is illustrated including an optical connector 103, an electronic connector 104, and a TOSA, a ROSA and a module printed circuit board mounted within a housing 106. A first mechanical feature, e.g. a groove 107, can be provided to enable insertion of the module 101 into a compatible cage assembly, which would include a second mechanical feature, e.g. projection 38, 48, 68 or 78. A spring finger 110 extends from opto-electronic module 101, and includes an abutting portion 112 with an abutment surface 113, and a camming portion 114 with a first camming surface 115. The abutting portion 112 and the abutment surface 113 are similar to spring finger 90 and abutment surface 92, respectively. The camming portion 114 and the camming surface 115 are connected to the abutting portion 112, ideally formed out of the same spring finger 110.

The first camming surface 115 comprises a ramp positioned adjacent to the abutting portion 112.

FIG. 9 illustrates a faceplate 117 including second mechanical features, i.e. projections 118, and second camming surfaces, i.e. tabs 119, extending into openings 120a, 120b and 120c. During insertion of a compatible opto-electronic module 101 into faceplate 117, the second camming surface 119 will contact the first camming surface 115 and slide along the ramp formed thereby, gradually depressing the camming portion 114, and consequently the abutment portion 112 until the spring finger 110 is rotated parallel and into contact with the surface of the housing 106 with the abutment surface 113 inserted into a recess 116.

Figure 10:
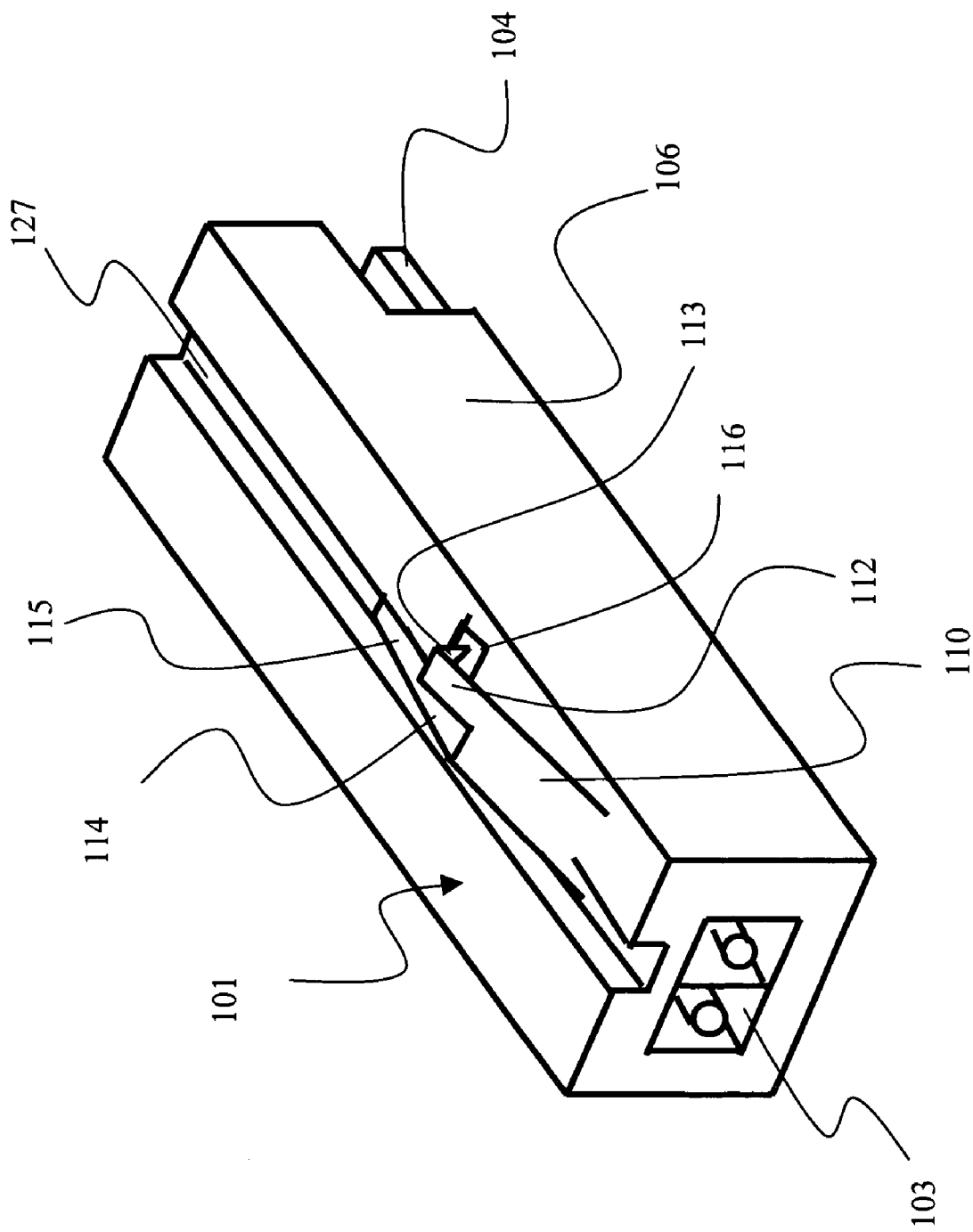
FIG. 10 is an isometric view of an opto-electronic module according to another embodiment of the present invention.

For opto-electronic systems already including the first and second mechanical features, e.g. groove 107 and projection 118, the tab 119 can be very small, i.e. less than the clearance between the housing 106 and the cage, and need not block entry of non compatible electro-optical modules; however, for systems without the first and second mechanical features, a tab 129 can be made somewhat larger to fulfill both functions, if the camming portion 114 with camming surface 115 are disposed within a groove 127 (see FIG. 10). In this case, the cage assembly, e.g. the faceplate or the cage, only needs a single tab 129, as in opening 120c of FIG. 9. The remaining elements of the opto-electrical module disclosed in FIG. 10 are identical to those in FIG. 8.

Figure 11:
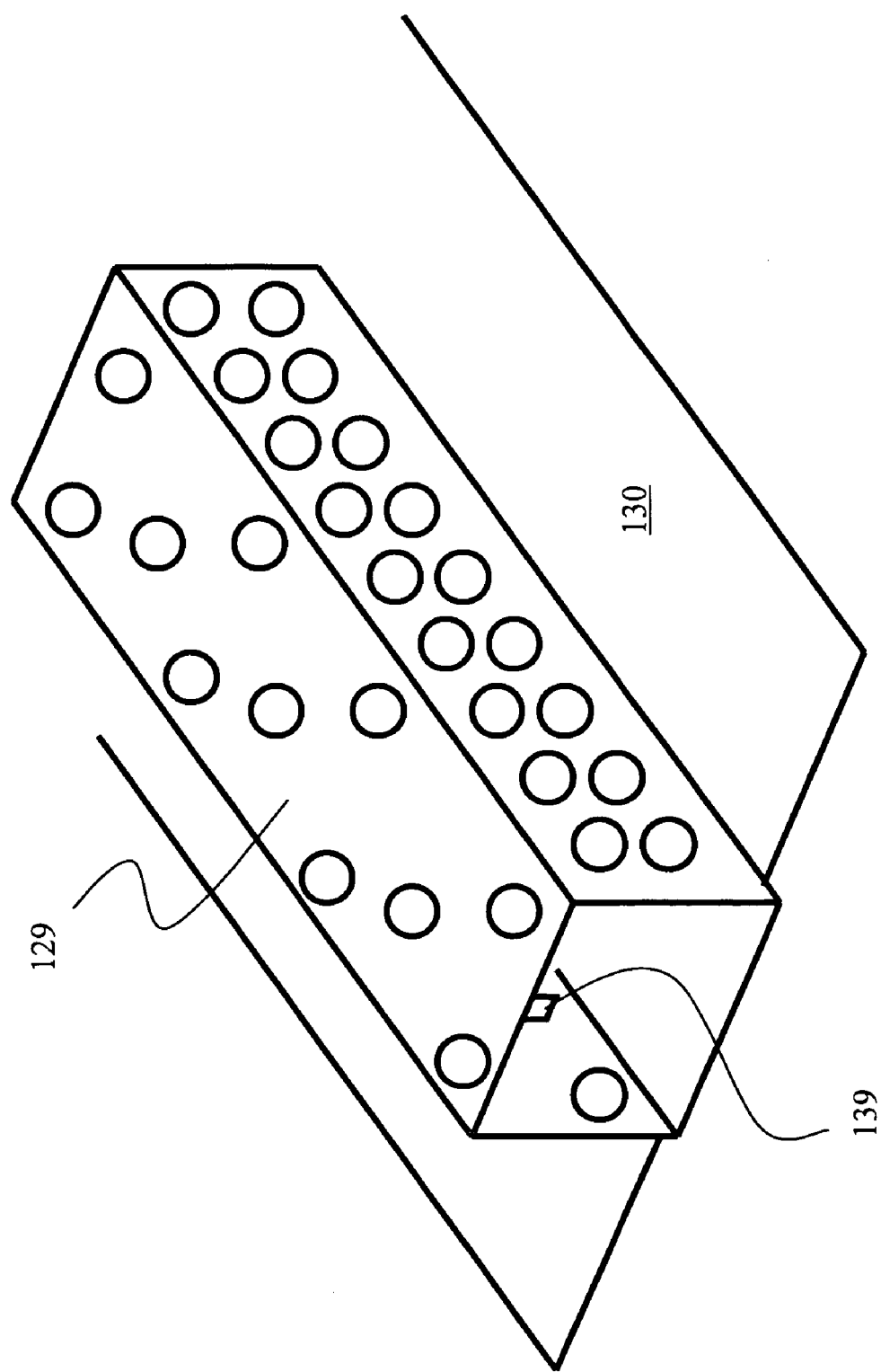
FIG. 11 is an isometric view of a cage according to another embodiment of the present invention.

For opto-electronic systems without the first and second mechanical features, spring fingers 90 or spring fingers 110 and small tabs 119, i.e. first and second camming surfaces, can be used to prevent or at least warn users of incompatible modules and cages. Opening 120b of FIG. 9 illustrates a cage assembly, e.g. a faceplate, with a second camming surface alone. As with the projections 38, 48, 68 and 78, the second camming surface can be provided on the faceplate (as illustrated) in FIG. 9 or on any other part of the cage assembly, e.g. the cage (FIG. 11), the host printed circuit board under the cage, or the electrical connector within the cage. FIG. 11 illustrates a cage 129 mounted on a host printed circuit board 130 with a tab 139, i.e. a second camming surface, extending from the cage 129 into cage area. The relative position of the spring fingers 90 and 110 and the tabs, i.e. the first and second camming surfaces, can be reversed, e.g. the spring fingers 90 and 110 extending from the faceplate 117 or the cage, while the tab or some other camming surface for rotating the spring finger 90 or 110 is found on the module 91 or 101.

We claim:

1. An opto-electronic system comprising:
    an optoelectronic module including a housing with an optical connector, a groove and a first electrical connector, and
    a cage assembly for mounting on a host printed circuit board, the cage assembly including:
        a faceplate having an opening through which the opto-electronic module passes,
        a cage forming a cavity for receiving the opto-electronic module therein with the optical connector extending outwardly therefrom, and
        a second electrical connector for mating with the first electrical connector,
    wherein the cage assembly includes a stop extending into the opening for receipt in the groove during insertion of the opto-electronic module into the cage, enabling the opto-electronic module to pass into the cage unobstructed, the cage assembly further includes a stop projection for preventing other non-compatible opto-electronic modules with similar cross-sectional dimensions to the optoelectronic module, but without the groove, from becoming fully inserted into said cage assembly.

2. The opto-electronic system according to claim 1, wherein the stop extends from the faceplate.

3. The opto-electronic system according to claim 1, wherein the stop extends from the cage.

4. The opto-electronic system according to claim 1, wherein the stop extends from the host printed circuit board.

5. The opto-electronic system according to claim 1, wherein the stop extends from the second electrical connector.

6. The opto-electronic system according to claim 1, wherein the groove extends from a front end to a rear end of the opto-electronic module housing.

7. The opto-electronic system according to claim 6, wherein the groove extends along a corner of the opto-electronic module at an intersection of two perpendicular surfaces thereof.

8. The opto-electronic system according to claim 1, further comprising a finger extending from the housing for abutting said cage assembly, thereby preventing the opto-electronic module from becoming fully inserted into said cage assembly without displacing said finger away from said cage assembly.

9. The optoelectronic system according to claim 8, further comprising a camming surface on said finger, and a tab on said cage assembly for engaging said camming surface during insertion of the opto-electronic module into said cage assembly, thereby pivoting the finger away from said cage assembly.

10. The opto-electronic system according to claim 8, wherein the finger comprises a spring finger biased outwardly from the housing with an abutment surface on an outer free end thereof.

11. An opto-electronic system comprising:
    an opto-electronic module including a housing and a first electrical connector, the housing including a first camming surface; and
    a cage assembly for mounting on a host printed circuit board, the cage assembly including a faceplate, a cage forming a cavity with an opening for receiving the opto-electronic module, and a second electrical connector for mating with the first electrical connector, the cage assembly including a second camming surface extending therefrom into the cavity or the opening for engaging the first camming surface, whereby the first or second camming surface is rotated relative to the housing to a module insertion position enabling the opto-electronic module to be fully inserted into the cage assembly, thereby preventing non-compatible opto-electronic modules with similar cross-sectional dimensions to the opto-electronic module, but without the first camming surface, from becoming fully inserted into said cage assembly, in which the cage assembly includes a stop extending therefrom into the cavity to prevent non-compatible opto-electronic modules with similar cross-sectional dimensions to the opto-electronic module from being fully inserted into the cage assembly unless the second camming surface is rotated relative to the housing.

12. The opto-electronic system according to claim 11, wherein the first or second camming surface comprises a spring finger extendable between said opto-electronic module and said cage assembly.

13. The opto-electronic system according to claim 12, wherein the spring finger includes an abutment surface on an outer free end thereof for engaging cage assemblies or modules without the first or second camming surface, respectively.

14. The opto-electronic system according to claim 12, wherein the second camming surface comprises a ramp for engaging the first camming surface and gradually rotating the spring finger.

15. The opto-electronic system according to claim 12, wherein the spring finger includes the second camming surface and extends from said housing for abutting cage assemblies without the first camming surface.

16. The opto-electronic system according to claim 15, wherein the second camming surface comprises a ramp formed in the spring finger adjacent to the abutment surface for engaging the first camming surface and gradually rotating the spring finger away from the cage assembly.

* * * * *